(12) United States Patent
Chen et al.

(10) Patent No.: US 10,690,841 B2
(45) Date of Patent: Jun. 23, 2020

(54) BACKLIGHT MODULE AND DISPLAY DEVICE

(71) Applicants: Beijing BOE Chatani Electronics Co., Ltd., Beijing (CN); BOE TECHNOLOGY GROUP CO., LTD., Beijing (CN)

(72) Inventors: Hongqiang Chen, Beijing (CN); Ting Li, Beijing (CN); Qilin Li, Beijing (CN)

(73) Assignees: Beijing BOE Chatani Electronics Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/407,910

(22) Filed: May 9, 2019

(65) Prior Publication Data

US 2020/0049875 A1  Feb. 13, 2020

(30) Foreign Application Priority Data

Aug. 9, 2018 (CN) .......................... 2018 1 0904267

(51) Int. Cl.
*F21V 8/00* (2006.01)
(52) U.S. Cl.
CPC .......... *G02B 6/009* (2013.01); *G02B 6/0051* (2013.01); *G02B 6/0053* (2013.01); *G02B 6/0068* (2013.01)

(58) Field of Classification Search
None
See application file for complete search history.

(56) References Cited

U.S. PATENT DOCUMENTS

| | | | |
|---|---|---|---|
| 9,057,806 B2* | 6/2015 | Ho | G02B 6/0021 |
| 2008/0137004 A1* | 6/2008 | Iwasaki | G02B 6/0031 349/64 |
| 2008/0285310 A1* | 11/2008 | Aylward | G02B 6/001 362/626 |
| 2009/0180282 A1* | 7/2009 | Aylward | G02B 6/0021 362/245 |
| 2011/0149594 A1* | 6/2011 | Terajima | G02F 1/133603 362/606 |
| 2019/0227214 A1* | 7/2019 | Chen | G02B 6/0021 |

* cited by examiner

*Primary Examiner* — Britt D Hanley
(74) *Attorney, Agent, or Firm* — Thomas | Horstemeyer LLP

(57) ABSTRACT

The present disclosure relates to the field of display technology, and provides a backlight module including a light guide plate, a diffusion assembly and a light source assembly. The light guide plate is provided with a hole thereon. The diffusion assembly is disposed over the light guide plate. The light source assembly has a light emitting portion. The light emitting portion is disposed within the hole, and includes a COB light source with an out-light surface facing towards the diffusion assembly and a LED light source with an out-light surface facing towards a hole wall of the hole. A transmittance at a position of the diffusion assembly opposite to the COB source light is smaller than a transmittance at a remaining position thereof.

16 Claims, 3 Drawing Sheets

BACKLIGHT MODULE AND DISPLAY DEVICE

CROSS-REFERENCE TO RELATED APPLICATIONS

The present application is based on and claims the benefit of and priority to Chinese Patent Application No. 201810904267.1, filed on Aug. 9, 2018, the entire contents of which are incorporated herein by reference.

TECHNICAL FIELD

The present disclosure relates to the field of display technology, in particular, to a backlight module and a display device provided with the backlight module.

BACKGROUND

With the maturity of liquid crystal display technology, requirements for narrow borders of display screens are increasing.

The mainstream design in the prior art has three narrow borders, and it is difficult to achieve a narrow border at the in-light side due to existence of a light bar. However, the desire for technology with four narrow borders is drawing increasing attention. The technology with four narrow borders gradually becomes an important factor to improve the market competitiveness of products, and how to realize a narrow border design on the in-light side has obviously become an urgent problem to be solved. Referring to a structural schematic view of an in-light side of a backlight module in the prior art shown in FIG. 1, a light guide plate 4 is disposed on a back plate 3, a diffusion assembly 5 is disposed on the light guide plate 4, a frame 2 is disposed outside of the back plate 3, a light bar 11 is disposed at an in-light side, and a light blocking plate 6 is disposed over the light bar 11, the light guide plate 4 and the diffusion assembly 5. In order to shield a dark region before the lamp, the light blocking plate 6 is designed to be widened accordingly. The width of the border at the in-light side of the display device currently in production, i.e., a value A, is between 11-15 mm.

Therefore, it is necessary to study a new backlight module and a display device mounted with the backlight module.

SUMMARY

An objective of the present disclosure is to overcome the deficiency of the prior art in which four narrow borders cannot be realized, and to provide a backlight module capable of realizing four narrow borders and a display device mounted with the backlight module.

The additional aspects and advantages of the present disclosure will be set forth in part in the following description, and will be apparent from the description, or may be learned through practice of the present disclosure.

According to an aspect of the present disclosure, a backlight module is provided, including:
a light guide plate provided with a hole thereon;
a diffusion assembly disposed over the light guide plate; and
a light source assembly having a light emitting portion, the light emitting portion being disposed within the hole and including a COB light source with an out-light surface facing towards the diffusion assembly and a LED light source with an out-light surface facing towards a hole wall of the hole;
wherein a transmittance at a position of the diffusion assembly opposite to the COB light source is smaller than a transmittance at a remaining position thereof.

In an example embodiment of the present disclosure, the light source assembly further includes:
a drive motor having a drive shaft; and
the light emitting portion further includes:
a PCB board provided in an elongated shape and fixed to the drive shaft of the drive motor, the COB light source being disposed at a side of the PCB board close to the diffusion assembly, and the LED light source being disposed on a side of the PCB board close to the hole wall at each of both ends of the PCB board in a longitudinal direction.

In an example embodiment of the present disclosure, the drive motor is a rotary motor having rotational speed greater than 37.5 rps (revolutions per second).

In an example embodiment of the present disclosure, the hole is a via hole disposed on the same center axis as that of the light guide plate.

In an example embodiment of the present disclosure, the backlight module further includes:
a reflective sheet provided with a first through hole thereon, the first through hole and the via hole being coaxially disposed, and the drive motor passing through the first through hole.

In an example embodiment of the present disclosure, the backlight module further includes:
a back plate provided with a second through hole thereon, the second through hole and the first through hole being coaxially disposed, and the drive motor passing through the second through hole and being fixed to the back plate.

In an example embodiment of the present disclosure, the light emitting portion further includes:
a PCB board disposed within the hole and having a shape which matches with the hole, the COB light source being disposed at a side of the PCB board close to the diffusion assembly, and the LED light source being disposed at a side of a peripheral of the PCB board close to the hole wall.

In an example embodiment of the present disclosure, a gap is provided between the hole wall and the LED light source.

In an example embodiment of the present disclosure, the diffusion assembly includes:
a first diffusion sheet disposed over the light guide plate;
a prism sheet disposed over the first diffusion sheet;
a second diffusion sheet disposed over the prism sheet;
wherein a transmittance at a position of at least one of the first diffusion sheet and the second diffusion sheet opposite to the COB light source is smaller than a transmittance at a remaining position thereof.

According to an aspect of the present disclosure, a display device is provided, including:
a backlight module according to any of the above embodiments.

BRIEF DESCRIPTION OF THE DRAWINGS

The features and advantages mentioned above, and other features and advantages, of the present disclosure will become more apparent from the detailed description of the example embodiments with reference to the accompanying drawings.

DETAILED DESCRIPTION

Figure 1:
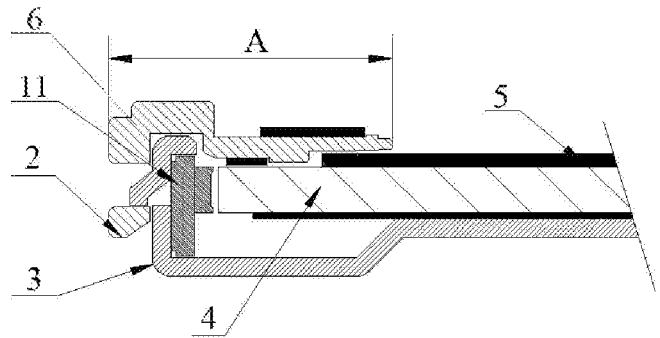
FIG. 1 is a schematic structural view of an in-light side of a backlight module of the prior art.

Example embodiments will now be described more fully with reference to the accompanying drawings. However, the example embodiments can be embodied in a variety of forms and should not be construed as being limited to the embodiments set forth herein; rather, these embodiments are provided so that the present disclosure would be thorough and complete, and the concept of the example embodiments are fully conveyed to those skilled in the art. The same reference numbers in the drawings denote the same or similar structures, and thus their detailed descriptions will be omitted.

Figure 2:
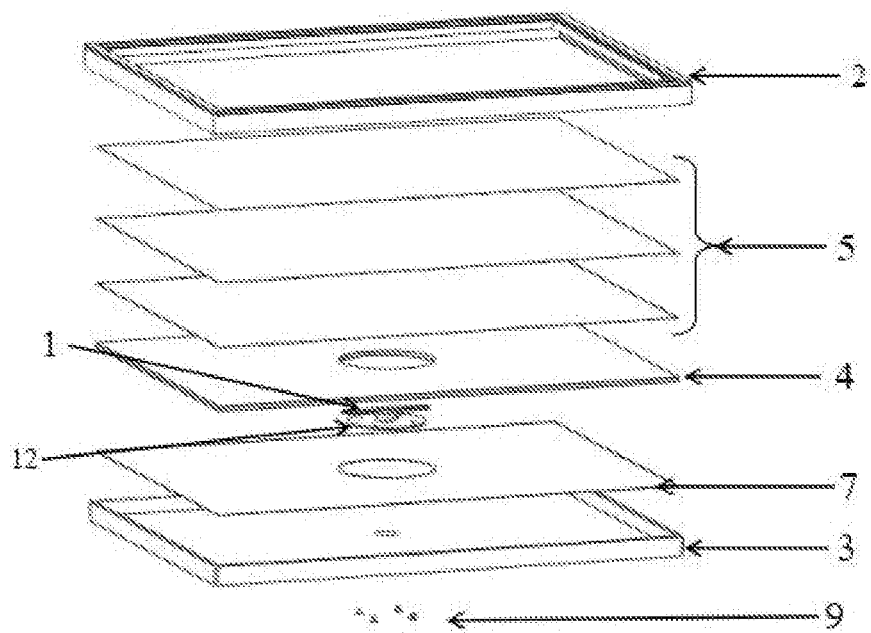
FIG. 2 is a schematic exploded structural view of an example embodiment of a backlight module of the present disclosure.

The present disclosure provides a backlight module with reference to FIG. 2, which is a schematic exploded structural view of an example embodiment of a backlight module of the present disclosure. The backlight module may include a light guide plate 4, a diffusion assembly 5, and a light source assembly. The light guide plate 4 is provided with a hole thereon. The diffusion assembly 5 is disposed over the light guide plate 4. The light source assembly has a light emitting portion 1, and the light emitting portion 1 may be disposed within the hole on the light guide plate 4. The light emitting portion 1 may include a COB light source 13 with an out-light surface facing towards the diffusion assembly 5, and a LED light source 14 with an out-light surface facing towards a hole wall of the hole on the light guide plate 4. A transmittance at a position of the diffusion assembly 5 opposite to the COB light source 13 is smaller than a transmittance at a remaining position thereof.

Figure 3:
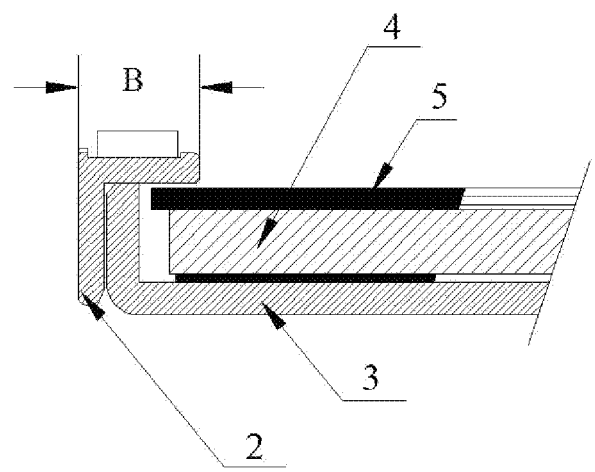
FIG. 3 is a schematic structural view of an in-light side of the backlight module shown in FIG. 2, wherein a light resource was disposed at the in-light side previously.

Referring to FIG. 3 a schematic structural view of an in-light side of the backlight module is shown in which a light resource was disposed at the in-light side previously. The light emitting portion 1 is disposed within the hole on the light guide plate and, at this time, the backlight module does not have an in-light side and all of its periphery may be provided as a narrow border. In the backlight module of the present disclosure, a width B of the border of the in-light side, at which a light resource was disposed previously, is substantially greater than or equal to 2 mm, but less than or equal to 4 mm, which is reduced relative to a width A of the border of the in-light side in the prior art in which the width A is substantially greater than or equal to 11 mm, but less than or equal to 15 mm. As the width B is much smaller than the width A, the present disclosure realizes a design with four narrow borders.

The backlight module of the present disclosure will be described in detail below by means of the following example embodiments.

Figure 4:
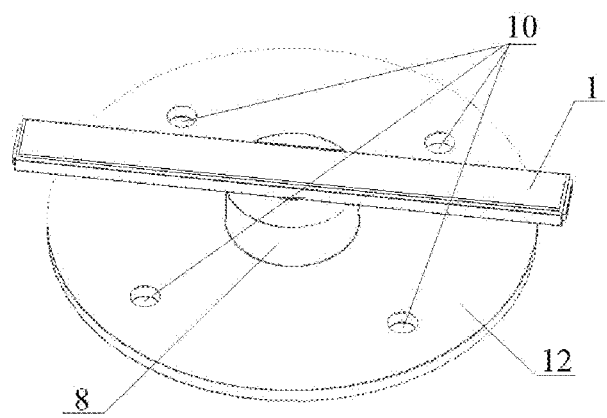
FIG. 4 is a perspective structural view of the light source assembly shown in FIG. 2.

Referring to FIG. 4, a perspective structural view of a light source assembly is shown, where the light source assembly may include a drive motor 8 having a drive shaft and the light emitting portion 1.

Figure 5:
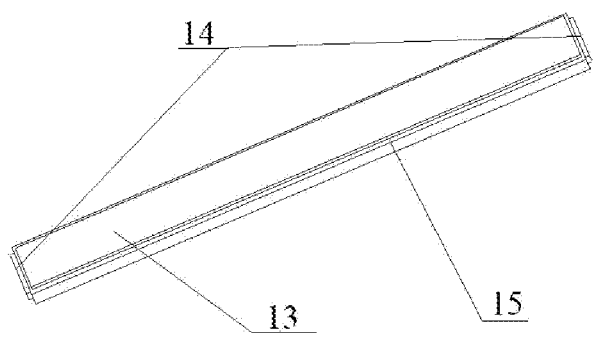
FIG. 5 is a schematic structural view of a light emitting portion shown in FIG. 4.

In an example embodiment, and referring to FIG. 5, a schematic structural view of the light emitting portion 1 is shown, where the light emitting portion may include a PCB board 15 in an elongated shape having sides that are symmetrically fixed to the drive shaft of the drive motor 8, so that the drive motor 8 can drive the PCB board 15 to rotate to form a circular plane. A COB light source 13 is disposed at a side of the PCB board 15 close to the diffusion assembly 5, i.e., an entire upper surface of the PCB board 15 is provided with the COB light source 13. An LED light source 14 is disposed on a side of the PCB board close to the hole wall at each of both ends of the PCB board 15 in a longitudinal direction.

The COB light source 13 is a high-efficiency integrated surface light source in which the LED chip is directly attached to the mirror metal substrate with high reflectivity. The COB light source 13 has various advantages such as high color development, uniform light emission, no spot, health and environmental protection, and so forth.

The LED light source 14 disposed at both ends of the light-emitting portion 1 may be a LED spotlight or an ordinary LED lamp. In the present example embodiment, an LED spotlight is used and the number thereof may be one or plural. The number of LED light sources 14 at both ends can be the same. In the case where two or more LED light sources 14 are provided, both ends of the PCB board 15 in the longitudinal direction may be provided in an arc shape. In the case where one LED light source 14 is provided, both ends of the PCB board 15 in the longitudinal direction may be provided in a straight-line type.

In the present example embodiment, a motor base 12 is mounted on the drive motor 8, where the motor base 12 is provided with a through hole 10 through which a screw 9 may fix the drive motor 8.

Figure 6:
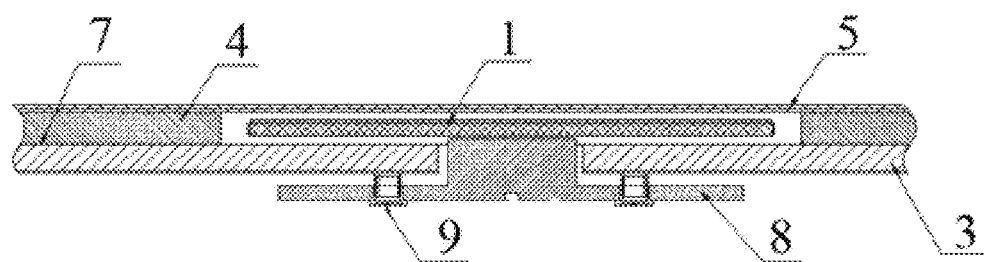
FIG. 6 is a partial cross-sectional view of the light source assembly shown in FIG. 4 after mounted on the reflective sheet.

Referring to FIG. 6, a partial cross-sectional view of the light source assembly is shown after being mounted on the reflective sheet 7. The hole on the light guide plate 4 is a via hole and is disposed on the same center axis as that of the light guide plate 4, i.e., the via hole is located at a center position of the light guide plate 4, so that the distance between the LED light source 14 at both ends of the PCB board 15 and the both sides of the light source assembly are the same, which is more favorable for forming uniform light output.

In the present example embodiment, the hole on the light guide plate 4 is a circular via hole. The backlight module may further include a reflective sheet 7 and a back plate 3.

The reflective sheet 7 and the back plate 3 are described in detail herein. The reflective sheet 7 is provided with a first through hole thereon, and the first through hole and the hole on the light guide plate 4 are coaxially disposed, so that the first through hole is also substantially located at the center position of the reflective sheet 7. The back plate 3 is provided with a second through hole thereon, and the second through hole and the first through hole are coaxially disposed. The drive motor 8 passes through the second through hole on the back plate 3 and the first through hole on the reflective sheet 7, and is connected with the light emitting portion 1 within the via hole located on the light guide plate 4. The drive motor 8 may drive the light emitting portion 1 to rotate. Since the light emitting portion 1 needs to be rotated while being supplied power, the connection between the light emitting portion 1 and its supply lines needs to be realized by using a conductive slip ring in order to avoid any damage of the lines due to rotation, i.e., a rotating portion of the conductive slip ring is connected with the supply line at the light emitting portion 1 side, and a fixed portion of the conductive slip ring is connected with the supply line at the power source side.

Further, the drive motor 8 may be a linear motor, and a surface light source may be formed by driving the light-emitting portion 1 with the linear motor to perform linear motion. In this case, the LED light sources 14 are required to be disposed on all the sides of the periphery of the PCB board 15 close to the hole wall.

In the present example embodiment, the drive motor 8 is fixed on the back plate 3, and may be fixed by using a screw 9. A screw hole is formed on the back plate 3, and the screw 9 passes through the through hole 10 and is screw-fitted into the screw hole, so that the drive motor 8 is fixed on the back plate 3. Here, four screw holes are provided, and four screws 9 are correspondingly required. The numbers of the screw holes and the screws 9 may be changed, for example, to two, three, six, etc., and the fixing method may also be replaced by other means, such as by using super glue.

In order to avoid any contact between the light-emitting portion 1 and the light guide plate 4 which leads to serious light leakage and causes unusable, and also in order to prevent the light-emitting portion 1 from rubbing against the light guide plate 4 during rotation, it is necessary to make the diameter of the hole on the light guide plate 4 larger than the length of the light-emitting portion 1 by 2 mm, i.e., a gap is provided between the hole wall and the LED light source 14, which is about 1 mm.

In the present example embodiment, by driving the drive motor 8, the light-emitting portion 1 is rotated at a constant speed of 37.5 rpm or more, forming human eye visual retention effect by rotation. When the human eye views a certain frame of picture, it remains for about ¹⁄₂₄ second. If the rotating light reaches more than 24 frames of a picture, the complete surface light source may be seen.

In the present example embodiment, in operation, the COB light source 13 is rotated to form a surface light source in the middle portion, and mainly in other regions the sidewall LED spotlights irradiate into the light guide plate 4 and the light is emitted through the light exit dots on the light guide plate 4.

Figure 7:
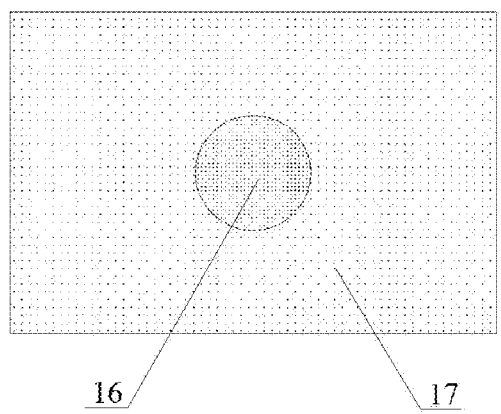
FIG. 7 is a schematic view of a transmittance distribution of the diffusion assembly shown in FIG. 2.

In the present example embodiment, the diffusion assembly 5 may include a first diffusion sheet disposed over the light guide plate 4, a prism sheet disposed over the first diffusion sheet, and a second diffusion sheet disposed over the prism sheet. A transmittance at a position of the first diffusion sheet opposite to the COB light source 13 is smaller than a transmittance at a remaining position thereof. The position of the first diffusion sheet opposite to the COB light source 13 is a portion of the first diffusion sheet directly opposite to the surface light source formed by rotation of the COB light source 13, i.e., an orthographic projection of the first diffusion sheet opposite to the COB light source 13 on the back plate overlaps with an orthographic projection of the surface light source formed by rotation of the COB light source 13 on the back plate. Referring to FIG. 7, a schematic view of transmittance distribution of the diffusion assembly 5 is shown. Specifically, the transmittance at a position of the first diffusion sheet opposite to the COB light source 13 is about 50%, i.e., the transmittance of the region 16 shown in the figure is 50%, while the transmittance at the remaining position is about 70%, i.e., the transmittance of the region 17 shown in the figure is 70%. The first diffusion sheet and the second diffusion sheet may be diffusion sheets coated with fine particles, or a structure in which a plurality of chemical particles, such as as scattering particles, are added to the diffusion film substrate and may be used. The arrangement generally makes the light passing through the diffusion assembly 5 to be uniformly emitted. Therefore, the transmittance of the second diffusion sheet may be regionalized, so that the light passing through the diffusion assembly 5 is uniformly emitted. It is also possible to achieve the same effect by providing a suitable regionalized transmittance for the first diffusion sheet and the second diffusion sheet at the same time.

The present disclosure also provides another example embodiment, and it is mainly different from the foregoing example embodiment in that: the light source assembly is different, and the example embodiment directly adopts the surface light source; at the same time, it is not necessary to provide a second through hole on the back plate 3, nor to provide a first through hole on the reflective plate. The differences will be described in detail below.

In the present example embodiment, the hole on the light guide plate 4 may be a blind hole, and the shape of the blind hole may be rectangular. The blind hole is disposed at the center position of the light guide plate 4. It can be understood by those skilled in the art that the hole on the light guide plate 4 may also be a through hole, and in this case, the light emitting portion 1 may be fixed on the reflective plate. The shape of the hole may also be circular, trapezoidal or elliptical, and the like. The blind hole may not be disposed at the center position of the light guide plate 4.

The light emitting portion may include a PCB board 15, which is disposed within the blind hole and has a shape matching with the hole. A COB light source 13 is disposed at a side of the PCB board 15 close to the diffusion assembly 5, and a plurality of LED light sources 14 are disposed at a side of a peripheral of the PCB board 15 close to the hole wall. In the case where the blind hole is disposed at the center position of the light guide plate 4, the plurality of LED light sources 14 may be uniformly disposed on the peripheral wall of the PCB board 15. In the case where the blind hole is not disposed at the center position of the light guide plate 4, the plurality of LED light sources 14 may be unevenly disposed on the peripheral wall of the PCB board 15, and less LED light sources 14 may be disposed at the side closer to the border of the backlight module, and more LED light sources 14 may be disposed at the side farther from the border of the backlight module, so as to enable the backlight module to form a uniform light output.

In the present example embodiment, since the PCB board 15 is disposed within the hole on the light guide plate 4, the shape of the corresponding PCB board 15 may be also rectangular. Corresponding to the shape of the hole, the shape of the PCB board 15 may be circular, trapezoidal, or elliptical, etc.

In the present example embodiment, the COB light source 13 is also rectangular. The LED light source 14 disposed at a side of a periphery of the PCB board 15 close to the hole wall may be an LED spotlight or an ordinary LED lamp. In the present example embodiment, an LED spotlight is used. Corresponding to the shape of the hole, the shape of the COB light source 13 may be circular, trapezoidal, or elliptical, etc.

In the present example embodiment, the COB light source 13 is disposed within a blind hole on the light guide plate 4. In operation, a surface light source is directly formed by the COB light source 13 in a region opposite to the hole and, generally, in other regions the sidewall LED spotlights irradiate into the light guide plate 4 and the light is emitted through the light exit dots on the light guide plate 4.

In the present example embodiment, in order to avoid contact between the rectangular COB surface light source and the light guide plate 4 which leads to serious light leakage and causes the module to be unusable, a gap is provided between the hole wall of the hole on the light guide plate 4 and the LED light source 14, and is about 1 mm.

Further, the present disclosure further provides a display device, which may include the backlight module described above. The specific structure of the backlight module has been described in detail above, and therefore will not be repeated herein.

As can be seen from the above technical solutions, the present disclosure has at least one of the following advantages and positive effects:

In the backlight module of the present disclosure, a hole is provided on the light guide plate, and a light emitting portion is disposed within the hole. The light emitting portion includes a COB light source with an out-light surface facing towards the diffusion assembly and an LED light source with an out-light surface facing towards the hole wall, and a transmittance at a position of the diffusion assembly opposite to the COB light source is smaller than a transmittance at a remaining portion thereof. On one hand, the light emitting portion is disposed within the hole on the light guide plate, the backlight module does not have an in-light side and all the periphery thereof may be provided as a narrow border. On the other hand, the uniformity of the light output of the entire backlight module may be adjusted by the differences in transmittance of the diffusion module. Further, the COB light source emits light uniformly and has no spots, which further improves the uniformity of the light output of the entire backlight module.

The features, structures, or characteristics described above may be combined in any suitable manner in one or more embodiments, and the features discussed in the various embodiments are interchangeable, if possible. In the description above, numerous specific details are provided in order to fully understand the embodiments of the present disclosure. However, those skilled in the art will appreciate that the technical solution of the present disclosure may be practiced without one or more of the specific details, or other methods, components, materials, and the like may be employed. In other instances, well-known structures, materialism or operations are not shown or described in detail to avoid obscuring aspects of the present disclosure.

The phrase "about" or "approximately" as used in this specification generally refers to be a given value or a range within 20%, preferably within 10%, and more preferably within 5%. The numerical value given herein is an approximate value, i.e., meanings that a meaning of "about", "probably", "approximately" and "substantially" may be implied, unless otherwise specified.

Although the relative terms such as "on", "below", "upper" and "lower" are used in the specification to describe the relative relationship of one component to another component, these terms are used in this specification for convenience only, for example, a direction in the example according to the accompanying drawings. It should be understood that if the device is turned upside down, the "upper" component described above will become a "lower" component. Other relative terms such as "high", "low", "top" and "bottom" also have similar meanings. When a structure is "on" another structure, it is possible that the structure is integrally formed on another structure, or that the structure is "directly" disposed on another structure, or that the structure is "indirectly" disposed on another structure through other structures.

In the present specification, the terms such as "a", "an", "the" and "said" are used to indicate the existence of one or more elements/components; the terms "comprise", "include", "have", "contain" and their variants are used to be open-type and are meant to include additional elements/components, etc., in addition to the listed elements/components/etc.; the terms "first", "second", etc. are used only as marks, rather than limitation for the number of objects.

It should be understood that the present disclosure does not limit its application to the detailed structure and arrangement of the components presented in the specification. The present disclosure may have other embodiments and may be implemented and performed in various ways. The foregoing variations and modifications are intended to fall within the scope of the present disclosure. It should be understood that the present disclosure disclosed and defined herein is extended to all alternative combinations of two or more individual features that are mentioned or apparent in the drawings. All of these different combinations constitute a number of alternative aspects of the present disclosure. The embodiments described in the specification illustrate the best mode of the present disclosure, and will enable those skilled in the art to utilize the present disclosure.

What is claimed is:

1. A backlight module, comprising:
   a light guide plate provided with a hole thereon;
   a diffusion assembly disposed over the light guide plate; and
   a light source assembly having a light emitting portion, the light emitting portion being disposed within the hole and including a chip-on-board (COB) light source with an out-light surface facing towards the diffusion assembly and a light-emitting diode (LED) light source with an out-light surface facing towards a hole wall of the hole, wherein:
   the light source assembly further includes a drive motor having a drive shaft;
   the light emitting portion further includes a printed circuit board (PCB) board in an elongated shape fixed to the drive shaft of the drive motor, the COB light source being disposed at a side of the PCB board close to the diffusion assembly, and the LED light source being disposed on a side of the PCB board close to the hole wall at each of both ends of the PCB board in a longitudinal direction; and
   a transmittance at a position of the diffusion assembly opposite to the COB light source is smaller than a transmittance at a remaining position thereof.

2. The backlight module according to claim 1, wherein the drive motor is a rotary motor with a rotational speed greater than 37.5 rps.

3. The backlight module according to claim 1, wherein the hole is a via hole which is disposed on the same center axis as that of the light guide plate.

4. The backlight module according to claim 3, wherein the backlight module further comprises: a reflective sheet provided with a first through hole thereon, the first through hole and the via hole being coaxially disposed, and the drive motor passing through the first through hole.

5. The backlight module according to claim 4, wherein the backlight module further comprises: a back plate provided with a second through hole thereon, the second through hole and the first through hole being coaxially disposed, and the drive motor passing through the second through hole and being fixed to the back plate.

6. The backlight module according to claim 1, wherein the light emitting portion further includes: a PCB board disposed within the hole and having a shape which matches with the hole, the COB light source being disposed at a side of the PCB board close to the diffusion assembly, and the LED light source being disposed at a side of a peripheral of the PCB board close to the hole wall.

7. The backlight module according to claim 1, wherein a gap is provided between the hole wall and the LED light source.

8. The backlight module according to claim 1, wherein the diffusion assembly includes:
  a first diffusion sheet disposed over the light guide plate;
  a prism sheet disposed over the first diffusion sheet; and
  a second diffusion sheet disposed over the prism sheet, wherein a transmittance at a position of at least one of the first diffusion sheet and the second diffusion sheet opposite to the COB light source is smaller than a transmittance at a remaining position thereof.

9. A display device, comprising:
  a backlight module, comprising:
    a light guide plate provided with a hole thereon;
    a diffusion assembly disposed over the light guide plate; and
    a light source assembly having a light emitting portion, the light emitting portion being disposed within the hole and including a chip-on-board (COB) light source with an out-light surface facing towards the diffusion assembly and a light-emitting diode (LED) light source with an out-light surface facing towards a hole wall of the hole, wherein:
      the light source assembly further includes a drive motor having a drive shaft;
      the light emitting portion further includes a printed circuit board (PCB) board in an elongated shape fixed to the drive shaft of the drive motor, the COB light source being disposed at a side of the PCB board close to the diffusion assembly, and the LED light source being disposed on a side of the PCB board close to the hole wall at each of both ends of the PCB board in a longitudinal direction; and
      a transmittance at a position of the diffusion assembly opposite to the COB light source is smaller than a transmittance at a remaining position thereof.

10. The display device according to claim 9, wherein the drive motor is a rotary motor with a rotational speed greater than 37.5 rps.

11. The display device according to claim 9, wherein the hole is a via hole which is disposed on the same center axis as that of the light guide plate.

12. The display device according to claim 11, wherein the backlight module further comprises: a reflective sheet provided with a first through hole thereon, the first through hole and the via hole being coaxially disposed, and the drive motor passing through the first through hole.

13. The display device according to claim 12, wherein the backlight module further comprises: a back plate provided with a second through hole thereon, the second through hole and the first through hole being coaxially disposed, and the drive motor passing through the second through hole and being fixed to the back plate.

14. The display device according to claim 9, wherein the light emitting portion further includes: a PCB board disposed within the hole and having a shape which matches with the hole, the COB light source being disposed at a side of the PCB board close to the diffusion assembly, and the LED light source being disposed at a side of a peripheral of the PCB board close to the hole wall.

15. The display device according to claim 9, wherein a gap is provided between the hole wall and the LED light source.

16. The display device according to claim 9, wherein the diffusion assembly includes:
  a first diffusion sheet disposed over the light guide plate;
  a prism sheet disposed over the first diffusion sheet;
  a second diffusion sheet disposed over the prism sheet; and
  wherein a transmittance at a position of at least one of the first diffusion sheet and the second diffusion sheet opposite to the COB light source is smaller than a transmittance at a remaining position thereof.

* * * * *